(12) United States Patent
Hu (10) Patent No.: US 11,338,999 B2
(45) Date of Patent: May 24, 2022

(54) ARTICLE STORAGE DEVICE, PALLETIZING SYSTEM AND ARTICLE STORAGE METHOD

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Jinxing Hu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 16/759,786

(22) PCT Filed: Sep. 30, 2018

(86) PCT No.: PCT/CN2018/108956
§ 371 (c)(1),
(2) Date: Apr. 28, 2020

(87) PCT Pub. No.: WO2019/128360
PCT Pub. Date: Jul. 4, 2019

(65) Prior Publication Data
US 2021/0179354 A1 Jun. 17, 2021

(30) Foreign Application Priority Data
Dec. 28, 2017 (CN) .......................... 201711455335.2

(51) Int. Cl.
*B65G 1/137* (2006.01)
*B65G 47/24* (2006.01)

(52) U.S. Cl.
CPC ........... *B65G 1/1375* (2013.01); *B65G 47/24* (2013.01)

(58) Field of Classification Search
CPC .... B65G 1/0485; B65G 1/1375; B65G 47/24; B65G 47/5113; B65G 2207/24; B65G 21/18; B65G 1/127
See application file for complete search history.

(56) References Cited

U.S. PATENT DOCUMENTS

| 3,666,083 A | 5/1972 | Smith |
| 3,865,227 A | 2/1975 | Kaak |

(Continued)

FOREIGN PATENT DOCUMENTS

| CN | 1093673 A | 10/1994 |
| CN | 206456846 U | 9/2017 |

(Continued)

OTHER PUBLICATIONS

International Search Report dated Jan. 7, 2019 in PCT/CN2018/108956 (with English Translation), 12 pages.

(Continued)

*Primary Examiner* — Gregory W Adams
(74) *Attorney, Agent, or Firm* — Oblon, McClelland, Maier & Neustadt, L.L.P.

(57) ABSTRACT

An article storage device includes a first conveying line, a second conveying line, and a temporary storage passage, wherein the first conveying line and the second conveying line ascend spirally around the temporary storage passage to form a double spiral structure, and two ends of the temporary storage passage respectively are in communication with the first conveying line and the second conveying line, the first conveying line conveys the article to the temporary storage passage, the temporary storage passage receives the article from the first conveying line and conveys the article to the second conveying line, and the second conveying line receives the article from the temporary storage passage and conveys the article.

20 Claims, 3 Drawing Sheets

(56) References Cited

U.S. PATENT DOCUMENTS

| | | | | |
|---|---|---|---|---|
| 5,350,050 A * | 9/1994 | Franke | ..................... | B65G 1/06 |
| | | | | 198/347.1 |
| 5,413,213 A * | 5/1995 | Golz | ........................ | A24C 5/35 |
| | | | | 198/778 |
| 6,152,291 A | 11/2000 | Steeber et al. | | |
| 6,793,062 B2 * | 9/2004 | Hammock | ................ | A24C 5/35 |
| | | | | 198/347.1 |
| 7,669,706 B2 * | 3/2010 | McLaughlin | ............. | B07C 3/02 |
| | | | | 198/349 |
| 8,770,376 B2 * | 7/2014 | Takens | ............... | B65G 47/5131 |
| | | | | 198/347.1 |
| 8,833,545 B2 * | 9/2014 | Perl | ...................... | B65G 17/345 |
| | | | | 198/793 |
| 9,334,111 B2 * | 5/2016 | Hoynash | ................ | B65G 1/026 |
| 2016/0272437 A1 * | 9/2016 | Beesley | ............. | B65G 47/5104 |

FOREIGN PATENT DOCUMENTS

| | | |
|---|---|---|
| JP | 5-132115 A | 5/1993 |
| JP | 9-156735 A | 6/1997 |

OTHER PUBLICATIONS

Combined Chinese Office Action and Search Report dated Oct. 22, 2019 in corresponding Chinese Patent Application No. 201711455335.2 (with English Translation of Category of Cited Documents), 10 pages.

* cited by examiner

ARTICLE STORAGE DEVICE, PALLETIZING SYSTEM AND ARTICLE STORAGE METHOD

CROSS-REFERENCE TO RELATED APPLICATIONS

The present application is based on and claims priority to China Patent Application No. 201711455335.2 filed on Dec. 28, 2017, the disclosure of which is incorporated by reference herein in its entirety.

TECHNICAL FIELD

The present disclosure relates to the field of article storage technology, and in particular, to an article storage device, a palletizing system, and an article storage method.

BACKGROUND

At present, in the field of warehousing, automatic hybrid palletizing technology is usually used instead of manual palletizing so as to improve the transport efficiency and effectively reduce the warehousing operation cost. If automatic hybrid palletizing is intended to be implemented, there is a requirement to accomplish article temporary storage and article sorting on a front end of the palletizing robot.

There are not many devices that may implement the temporary storage and sorting functions in the related art. For the situation of a high quantity of article transport, a multi-layer shuttle stereoscopic warehouse or a Miniload (a box-type automated stereoscopic warehouse suitable for light-weight goods) can be used to realize the temporary storage and sorting functions. However, such solution involves high costs and complicated devices. For the situation of a not so high quantity of article transport, the conveying line is generally designed as a matrix temporary storage system. However, with difficulties in realizing a sorting function, such system has a low efficiency and occupies a large area.

It should be noted that, the information in the portion of the background art of the present disclosure, which is merely intended to enhance the understanding of the overall background of the present disclosure, shall not be construed as admitting or hinting in any form that this information constitutes the prior art already commonly known by those skilled in the art.

SUMMARY

The embodiments of the present disclosure provide an article storage device, a palletizing system, and an article storage method to reduce the area occupied by the article storage device as much as possible.

According to a first aspect of the present disclosure, an article storage device is provided. The article storage device comprises a first conveying line, a second conveying line, and a temporary storage passage, wherein the first conveying line and the second conveying line ascend spirally around the temporary storage passage to form a double spiral structure, and two ends of the temporary storage passage are respectively in communication with the first conveying line and the second conveying line, the first conveying line conveys the article to the temporary storage passage, the temporary storage passage receives the article from the first conveying line and conveys the article to the second conveying line, and the second conveying line receives the article from the temporary storage passage and conveys the article.

In one embodiment, an upper surface of a conveying portion of the first conveying line that is in communication with the temporary storage passage is substantially flush with an upper surface of an entrance of the temporary storage passage; and/or, an upper surface of a conveying portion of the second conveying line that is in communication with the temporary storage passage is substantially flush with an upper surface of an exit of the temporary storage passage.

In one embodiment, an upper surface of the temporary storage passage is horizontally arranged.

In one embodiment, the first conveying line comprises a first conveying device for driving the article to move along an extension direction of the first conveying line and driving the article to move from the first conveying device to the temporary storage passage.

In one embodiment, the first conveying device comprises a plurality of wobble wheels, wherein after actuation, the wobble wheels rotate to drive the article to move along an extension direction of the first conveying line, and an axis of the wobble wheels is rotatable to change a driving direction of the wobble wheels, so that the article moves from the first conveying line to the temporary storage passage.

In one embodiment, the first conveying line further comprises a second conveying device for driving the article to move along an extension direction of the first conveying line, and the second conveying device and the first conveying device are alternately arranged.

In one embodiment, the second conveying device comprises a first conveyor belt.

In one embodiment, the temporary storage passage comprises a storage station and a conveying passage, wherein the storage station is configured to receive the article from the conveying passage and convey the stored article to the conveying passage, and the conveying passage is configured to receive the article from the first conveying line, to convey the article to the storage station, to receive the article from the storage station, and to convey the article to the second conveying line.

In one embodiment, the conveying passage is provided with a second conveyor belt for driving the article to move to a preset storage position on the storage station.

In one embodiment, the second conveyor belt is provided with a driving wheel group, wherein after actuation, the driving wheel group rotates, such that the article moves from the first conveying line to the conveying passage, from the conveying passage to the storage station, from the storage station to the conveying passage, and then from the conveying passage to the second conveying line under the driving of the second conveyor belt and the driving wheel group.

In one embodiment, the second conveyor belt is provided with a plurality of the driving wheel groups, each of which comprises a first driving wheel arranged along a first direction and a second driving wheel arranged along a second direction.

In one embodiment, a third driving wheel is provided on the storage station, wherein after actuation, the third driving wheel rotates to move the article from the conveying passage to the storage station and from the storage station to the conveying passage.

In one embodiment, the article storage device comprises at least two layers of the temporary storage passages which are arranged along a vertical direction.

In one embodiment, the article storage device comprises a plurality of the temporary storage passages provided on the same layer.

In one embodiment, a plurality of the temporary storage passages provided on the same layer are arranged in parallel.

In one embodiment, the second conveying line comprises a third conveyor belt.

In one embodiment, a space surrounded by the double spiral structure is oblong.

In one embodiment, the article storage device further comprises a scanning device for scanning a barcode on the article so as to obtain information of the article.

According to a second aspect of the present disclosure, a palletizing system is provided. The palletizing system comprises an article storage device, wherein the article storage device uses the above-described article storage device to temporarily store an article.

According to a third aspect of the present disclosure, an article storage method based on the above-described article storage device is provided. The article storage method comprises: conveying an article to a temporary storage passage through a first conveying line; receiving the article from the first conveying line through the temporary storage passage so as to temporarily store the article; conveying the article to a second conveying line through the temporary storage passage; and receiving the article from the temporary storage passage and conveying the article through the second conveying line.

In one embodiment, a specific operation of conveying an article to a temporary storage passage through a first conveying line comprises: obtaining information of the article; and conveying the article to the corresponding temporary storage passage based on the information.

In one embodiment, a specific operation of obtaining information of the article comprises: scanning a barcode on the article to obtain information of the article.

In one embodiment, a specific operation of receiving the article from the first conveying line through the temporary storage passage so as to temporarily store the article; and conveying the article to a second conveying line through the temporary storage passage comprises that: providing the temporary storage passage comprising a storage station and a conveying passage; receiving the article from the first conveying line and conveying the article to the storage station through the conveying passage, and temporarily storing the article through the storage station; and conveying the article located in the storage station according to a sequence determined based on the information to the second conveying line through the conveying passage.

Based on the above-described technical solution, in the embodiments of the present disclosure, the first conveying line and the second conveying line spirally ascend around the temporary storage passage and form a double spiral structure. The first conveying line may convey an article to the temporary storage passage for storage, and the temporary storage passage temporarily stores the article after receiving the article. The temporary storage passage may also convey the stored article to the second conveying line so as to continue convey the article through the second conveying line. In this process, the article storage device produces a temporary storage effect. Compared with the stereoscopic warehouse in the related art, the article storage device which uses a double spiral structure may increase the storage capacity of articles. Under the premise of the same storage capacity, it is possible to greatly reduce the occupied area and reduce the investment cost of the device.

Other features and advantages of the present disclosure will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the relevant art, a brief introduction will be given below for the accompanying drawings required to be used in the description of the embodiments or the relevant art. It is obvious that, the accompanying drawings illustrated as follows are merely the embodiments of the present disclosure. For those skilled in the art, they may also acquire other accompanying drawings according to the accompanying drawings provided on the premise that no inventive effort is involved.

In the drawings:
10. first conveying line; 20. second conveying line; 30. temporary storage passage; 40. article;
11. first conveying device; 12. second conveying device;
31. storage station; 32. conveying passage;
111. wobble wheel; 311. third driving wheel; 321. first driving wheel; 322. second driving wheel.

DETAILED DESCRIPTION

Next, the technical solution in the embodiments will be explicitly and completely described in combination with the accompanying drawings in the embodiments of the present disclosure. Apparently, the described embodiments are merely part of the embodiments of the present disclosure, rather than all the embodiments. On the basis of the embodiments of the present disclosure, all the other embodiments acquired by a person skilled in the art on the premise that no inventive effort is involved fall into the scope protected by the present disclosure.

In the description of the present disclosure, it is necessary to understand that, the azimuth or positional relations indicated by the terms "center", "transverse", "longitudinal", "front", "rear", "left", "right", "down", "vertical", "horizontal", "top", "bottom", "within", "outside", which are based on the azimuth or positional relations illustrated by the drawings, are only for facilitating description of the present disclosure and simplifying the description, rather than indicating or implying that the device or element referred thereto has to present a particular azimuth, and be constructed and operated in a particular azimuth, so that it cannot be understood as limiting the protection scope of the present disclosure.

Figure 1:
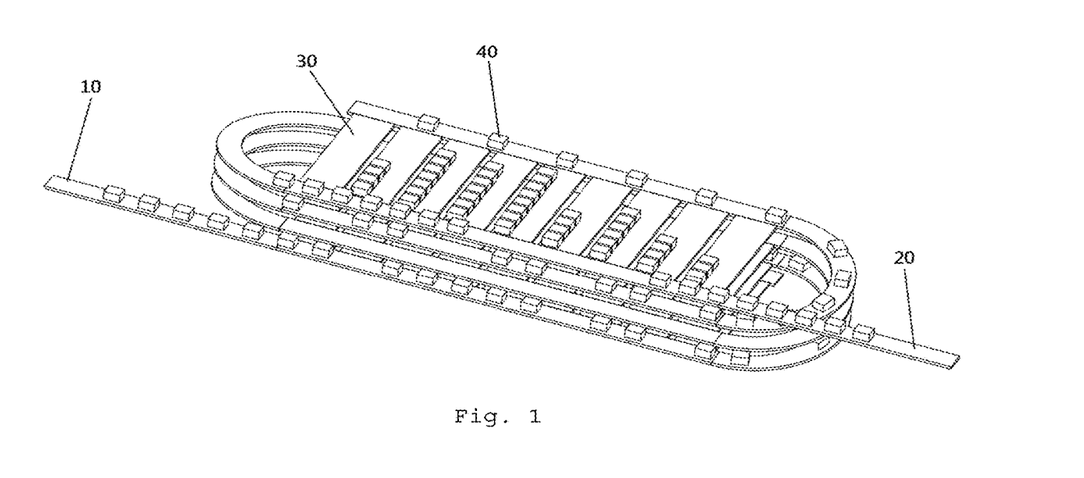
FIG. 1 is a schematic structural view of an article storage device according to one embodiment of the present disclosure.

As shown in FIG. 1, in one exemplary embodiment of an article storage device provided by the present disclosure, the article storage device includes a first conveying line 10, a second conveying line 20, and a temporary storage passage 30. The first conveying line 10 and the second conveying line 20 spirally ascend around the temporary storage passage 30 to form a double spiral structure. Two ends of the temporary storage passage 30 respectively communicate with the first conveying line 10 and the second conveying line 20. The first conveying line 10 conveys the article 40 to the temporary storage passage 30, and the temporary storage passage 30 receives the article 40 from the first conveying line 10 and conveys the article 40 to the second conveying line 20. The second conveying line 20 receives the article 40 from the temporary storage passage 30 and conveys the article 40.

In the above-described exemplary embodiment, the first conveying line 10 and the second conveying line 20 spirally ascend around the temporary storage passage 30 and form a double spiral structure. The first conveying line 10 may convey the article 40 to the temporary storage passage 30 for storage. After receiving the article 40, the temporary storage passage 30 may also convey it to the second conveying line 20 so as to continue convey the article 40 through the second conveying line 20. In this process, the article storage device produces a temporary storage effect. Compared with the stereoscopic warehouse in the related art, the article storage device which uses a double spiral structure may increase the storage capacity of articles. Under the premise of the same storage capacity, it is possible to greatly reduce the occupied area and reduce the investment cost of the device.

Alternatively, the upper surface of the conveying portion of the first conveying line 10 communicating with the temporary storage passage 30 is substantially flush with the upper surface of the entrance of the temporary storage passage 30, so that the article 40 may be more smoothly moved from the first conveying line 10 to the temporary storage passage 30; and/or, the upper surface of the conveying portion of the second conveying line 20 communicating with the temporary storage passage 30 is substantially flush with the upper surface of the exit of the temporary storage passage 30, so that the article 40 may be more smoothly moved from the temporary storage passage 30 to the second conveying line 20.

Alternatively, the upper surface of the temporary storage passage 30 is arranged horizontally. In this way, the article 40 can be stored on the temporary storage passage 30 more stably.

Figure 2:
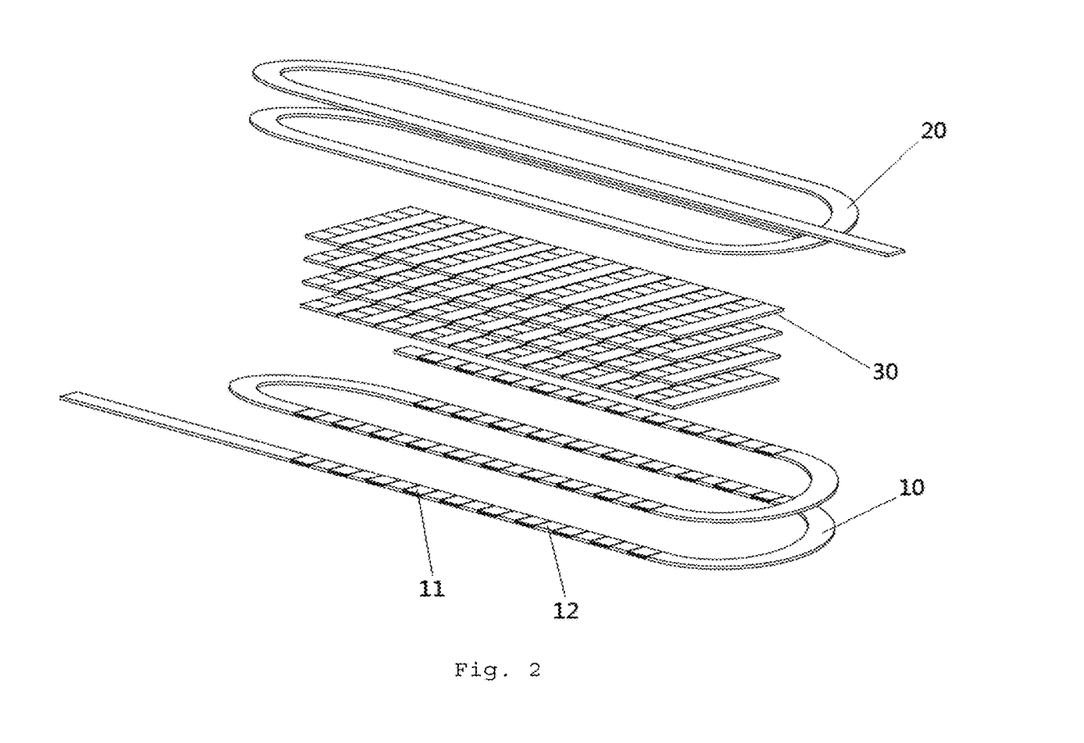
FIG. 2 is an exploded view of an article storage device according to one embodiment of the present disclosure.
Figure 3:
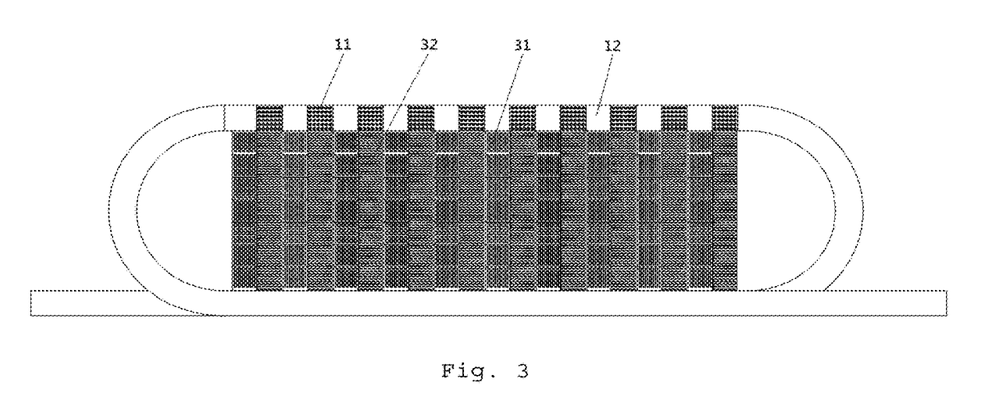
FIG. 3 is a top view of an article storage device according to one embodiment of the present disclosure.

As shown in FIGS. 2 and 3, the first conveying line 10 includes a first conveying device 11. The first conveying device 11 is configured to drive the article 40 to move along an extension direction of the first conveying line 10 and configured to drive the article 40 to move from the first conveying device 11 to the temporary storage passage 30. That is, the conveying direction of the first conveying device 11 can be changed, so that the article 40 may be driven to move along an extension direction of the first conveying line 10, or the article 40 may be driven to move from the first conveying device 11 to the temporary storage passage 30.

As shown in FIG. 1, the extension direction of the first conveying line 10 ascends spirally from left to right, and the temporary storage passage 30 is perpendicular to an extension direction of the first conveying line 10. When the article 40 is moved from the first conveying device 11 to the temporary storage passage 30, the movement direction of the article 40 is changed by 90°.

Figure 5:
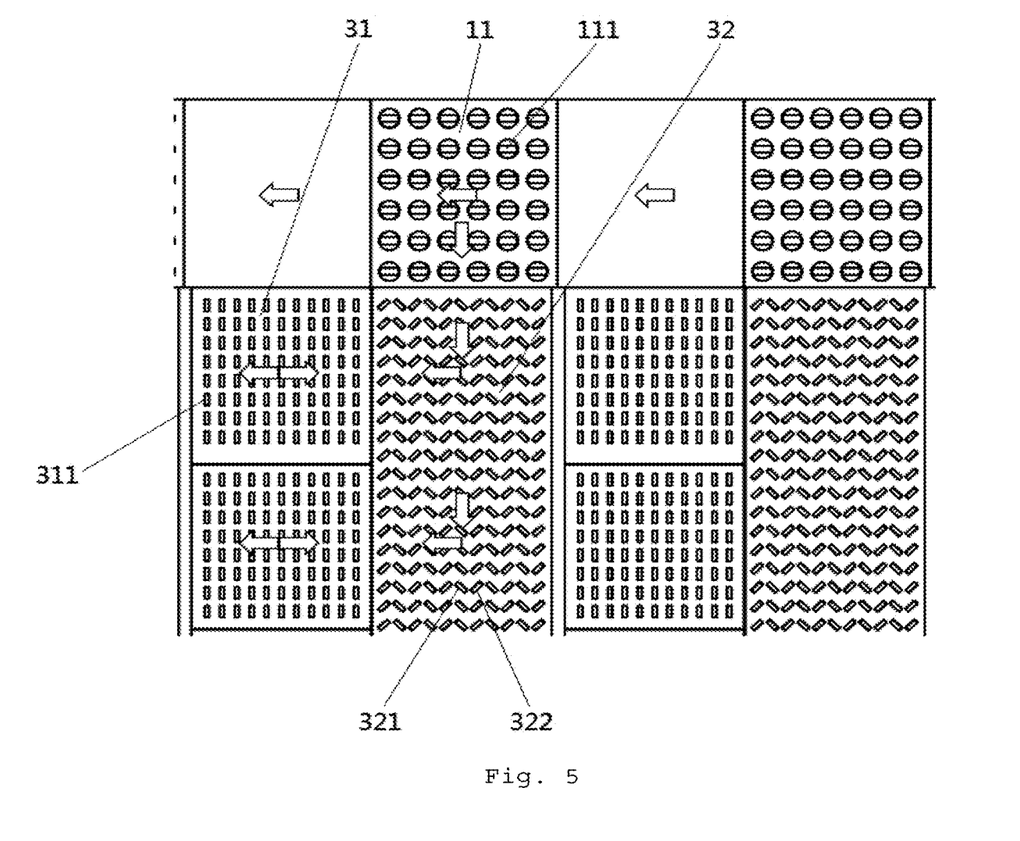
FIG. 5 is a view of conveying principles of a first conveying line and a temporary storage passage of an article storage device according to one embodiment of the present disclosure.

As shown in FIG. 5, alternatively, the first conveying device 11 includes a plurality of wobble wheels 111. After actuation, the wobble wheel 111 rotates to drive the article 40 along an extension direction of the first conveying line 10. An axis of the wobble wheel 111 can rotate to change a driving direction of the wobble wheel 111, so that the article 40 is moved from the first conveying line 10 to the temporary storage passage 30.

The plurality of wobble wheels 111 on the first conveying device 11 are evenly arranged. The wobble wheel 111 may be driven by a driving device. The wobble wheel 111 may rotate to drive the article 40 to move, and may also revolve, that is, rotate around a certain line. For example, when the article storage device is installed on the ground, the wobble wheel 111 may rotate around a vertical axis to change an axis direction of the wobble wheel 111, that is, to change an arrangement direction of the wobble wheel 111, thereby changing a driving direction, so that the article 40 may be moved from the first conveying line 10 to the temporary storage passage 30.

Further, the first conveying line 10 further includes a second conveying device 12. The second conveying device 12 is configured to drive the article 40 to move along an extension direction of the first conveying line 10. The second conveying device 12 and the first conveying device 11 are alternately arranged. As shown in FIG. 5, a second conveying device 12 is provided between two adjacent first conveying device 11, and a first conveying device 11 is provided between two adjacent second conveying device 12.

The second conveying device 12 only needs to enable driving the article 40 to move along an extension direction of the first conveying line 10 but does not need to change the driving direction. In this way, it is possible to lower the requirements for the second conveying device 12 and facilitate reducing the investment cost of the device.

Alternatively, the second conveying device 12 includes a first conveyor belt. The first conveyor belt is configured to drive the article 40 to move along an extension direction of the first conveying line 10.

Compared with the technical solution of using a shuttle to convey an article in the related art, the first conveying line in the embodiments of the present disclosure uses a first conveying device 11 including a wobble wheel 111 and a second conveying device 12 including a first conveyer belt, may reduce the cost of the article storage device, and facilitates improving the conveying efficiency.

Figure 4:
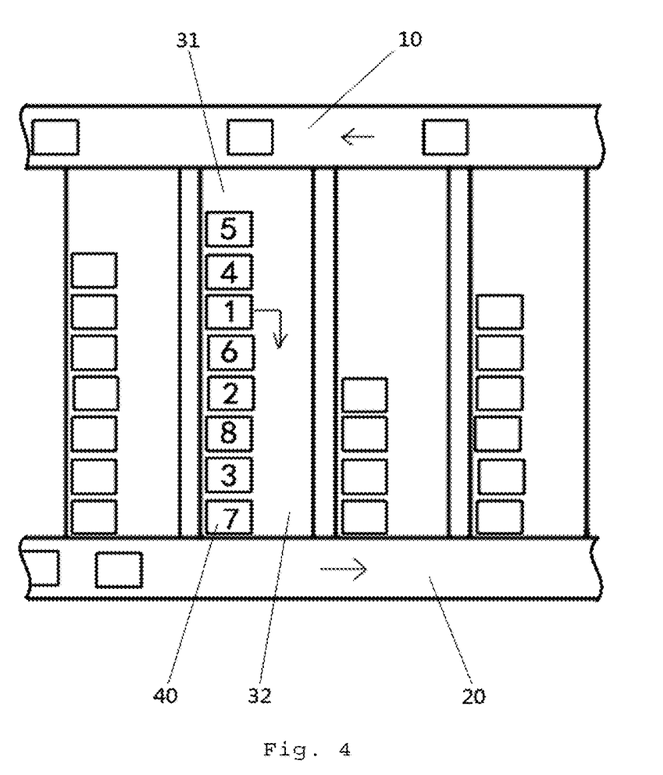
FIG. 4 is a partial structural view of an article storage device according to one embodiment of the present disclosure.

As shown in FIG. 4, the temporary storage passage 30 includes a storage station 31 and a conveying passage 32. The storage station 31 is configured to receive the article 40 from the conveying passage 32 and convey the stored article 40 to the conveying passage 32. The conveying passage 32 is configured to receive the article 40 from the first conveying line 10, conveys the article 40 to the storage station 31, receives the article 40 from the storage station 31, and conveys the article 40 to the second conveying line 20. By providing the storage station 31 and the conveying passage 32, when the article 40 need to be output, the article 40 may be removed according to a required sequence instead of being removed according to a storage sequence of the article 40, thereby improving the applicability of the article storage device, and also facilitating the output efficiency of articles.

Alternatively, the first conveying device 11 on the first conveying line 10 is in communication with the conveying passage 32 of the temporary storage passage 30, and the second conveying device 12 on the first conveying line 10 is in communication with the storage station 31. In this way, when the article 40 reaches the first conveying device 11, the movement direction may be changed by reversing the wobble wheel 111 on the first conveying device 11, so that the article 40 moves from the first conveying device 11 to the conveying passage 32. Moreover, it is possible that the storage station 31 is not in direct communication with the first conveying line 10, so that it is also possible that the second conveying device 12 does not have a reversing function.

Specifically, the conveying passage 32 is provided with a second conveyor belt for driving the article 40 to move to a preset storage position on the storage station 31. By providing the second conveyor belt, the article 40 may be conveyed to a preset storage position, so that the article 40 received from the first conveying line 10 is conveyed to a corresponding storage position through the second conveyor belt, or the article 40 is conveyed from the preset storage position to the second conveying line 20.

Further, the second conveyor belt is provided with a driving wheel group. After actuation, the driving wheel group rotates, and moves the article from the first conveying line 10 to the conveying passage 32, from the conveying passage 32 to the storage station 31, from the storage station 31 to the conveying passage 32, and then from the conveying passage 32 to the second conveying line 20 under the driving of the second conveyor belt and the driving wheel group. By providing the driving wheel group, it is possible to assist the second conveyer belt, and cooperate with the first conveying device 11 on the first conveying line 10, so that the article 40 is smoothly conveyed.

As shown in FIG. 5, the second conveyor belt is provided with a plurality of driving wheel groups, each of which includes a first driving wheel 321 arranged along a first direction and a second driving wheel 322 arranged along a second direction. Alternatively, the second conveyor belt is provided with a plurality of the first driving wheels 321 which are arranged in rows; and a plurality of the second driving wheels 322 which are arranged in rows. The driving wheel row consisting of a plurality of the first driving wheels 321 and the driving wheel row consisting of a plurality of the second driving wheels 322 are alternately arranged, that is, a driving wheel row consisting of the second driving wheels 322 is provided between two adjacent driving wheel rows consisting of the first driving wheels 321, and a driving wheel row consisting of the first driving wheels 321 is provided between two adjacent driving wheel rows consisting of the second driving wheels 322.

Alternatively, the first driving wheels 321 and the second driving wheels 322 can rotate forwardly and reversely, so as to realize the purpose of moving the article 40 from the first conveying line 10 to the conveying passage 32, from the conveying passage 32 to the storage station 31, from the storage station 31 to the conveying passage 32, and then from the conveying passage 32 to the second conveying line 20.

Alternatively, a third driving wheel 311 is provided on the storage station 31. After actuation, the third driving wheel 311 rotates to drive the article 40 to move from the conveying passage 32 to the storage station 31 and from the storage station 31 to the conveying passage 32.

The storage station 31 is provided with a plurality of third driving wheels 311 that are evenly arranged on the storage station 31. By providing the third driving wheel 311, the second conveyor belt and the driving wheel group may be cooperated to make the article 40 move stably and smoothly from the conveying passage 32 to the storage station 31 or from the storage station 31 to the conveying passage 32.

As shown in FIGS. 1 to 3, the article storage device includes at least two layers of temporary storage passages 30, for example, including four layers.

Alternatively, the article storage device includes a plurality of temporary storage passages 30 disposed on the same layer. This may increase the storage capacity.

Alternatively, a plurality of temporary storage passages located on the same layer are arranged in parallel. Such arrangement may make a more compact structural arrangement of the article storage device as much as possible, thereby facilitating reducing the occupied area.

Alternatively, the second conveying line 20 includes a third conveyor belt. The second conveying line 20 may use the same configuration as the first conveying line 10, in which there include a conveying device having wobble wheels and a conveyor belt that are alternately arranged; and may also use a different configuration from the first conveying line 10, for example only the third conveyor belt is provided.

Alternatively, the space surrounded by the double spiral structure is oblong. Such shape may not only allow the first conveying line 10 and the second conveying line 20 to facilitate implementing a spiral structure, but also make full use of the space formed between the first conveying line 10 and the second conveying line 20 as much as possible, thereby increasing the storage area and reducing the overall occupied area of the article storage device.

Alternatively, the article storage device further includes a scanning device, which is configured to scan a barcode on the article 40 so as to obtain the information of the article 40. After the information is obtained, the article 40 may be conveyed to a corresponding storage position according to the information, so as to implement classifying the article 40; the article 40 may also be selectively arranged or removed according to a preset sequence based on the article information, so as to realize the sorting function of the article 40.

Alternatively, the article storage device further includes a controller, and the movement of the article 40 may be controlled by the controller. The article storage device may further include a position detector to detect a position of the article 40, and the controller controls the movement of the article 40 according to the position of the article 40 detected by the position detector.

Based on the above-described article storage device, the present disclosure also provides a palletizing system, which comprises an article storage device. The article storage device uses the above-described article storage device to temporarily store the article 40.

Based on the above-described article storage device, the present disclosure also provides an article storage method, which comprises: conveying the article 40 to the temporary storage passage 30 through the first conveying line 10; receiving the article 40 from the first conveying line 10 through the temporary storage passage 30 so as to temporarily store the article 40; conveying the article 40 to the second conveying line 20 through the temporary storage passage 30; and receiving the article 40 from the temporary storage passage 30 and conveying the article 40 through the second conveying line 20.

Alternatively, the specific operation of conveying the article 40 to the temporary storage passage 30 through the first conveying line 10 includes: obtaining article information of article 40; conveying the article 40 to a corresponding temporary storage passage 30 according to the article information.

Further, the article 40 is received from the first conveying line 10 through the temporary storage passage 30 so as to temporarily store the article 40. The specific operation of conveying the article 40 to the second conveying line 20 through the temporary storage passage 30 includes that: the temporary storage passage 30 includes a storage station 31 and a conveying passage 32, wherein the article 40 is received from the first conveying line 10 through the conveying passage 32, and the received article 40 is conveyed to the storage station 31 so as to temporarily store the article 40 by the storage station 31; the article 40 located at the storage station 31 is removed according to a sequence determined based on the article information and conveyed to the second conveying line 20 through the conveying passage 32.

Alternatively, the specific operation of obtaining the information of the article 40 includes: scanning a barcode on the article 40 to obtain information of the article 40.

The positive technical effects of the article storage device in the above-described embodiments are also applicable to the palletizing system and the article storage method, which will not be described in detail here.

The operation process of the article storage device, the palletizing system, and the article storage method according to one embodiment of the present disclosure will be described in conjunction with FIGS. 1 to 5 below:

As shown in FIGS. 1-3, the article 40 enters the article storage device from the entrance of the first conveying line 10, and the article information is obtained after scanning. The article 40 is conveyed to a corresponding temporary storage passage 30 based on the article information, and the article 40 enters the storage station 31 through the conveying passage 32 of the temporary storage passage 30, so as to perform temporary storage. When palletizing is required, the article 40 is return from the storage station 31 to the conveying passage 32 and conveyed to the second conveying line 20 through the conveying passage 32 and output through the second conveying line 20.

Specifically, when the article 40 reaches the corresponding temporary storage passage 30, as shown in FIGS. 4 and 5, the first conveying device 11 on the first conveying line 10 carrying the article 40 includes wobble wheels 111. After rotation of the axis of the wobble wheels 111, with the direction shown in the drawings as a reference direction, the wobble wheels are changed from a latitudinal arrangement to a longitudinal arrangement. Since the article 40 still has an inertia to move leftward, the conveying passage 32 of the temporary storage passage 30 is provided with a second conveyor belt which is provided with a first driving wheel 321 and a second driving wheel 322. The second conveyor belt on the conveying passage 32 always moves up and down, so that when the article 40 moves from the first conveying line 10 to the conveying passage 32, the first driving wheel 321 moving to the receiving end of the second conveying is actuated to rotate. By cooperating the first driving wheel 321 with the wobble wheel 111 and the second conveyor belt, the movement direction of the article 40 is changed by 90°, and the article 40 is changed from a leftward movement to a downward movement. When the article 40 completely enters the conveying passage 32, the first driving wheel 321 stops rotation, and the article 40 is conveyed by the second conveyor belt to a storage position of the storage station 31 set by the controller for temporary storage.

When the article 40 reaches the position corresponding to the storage position, the third driving wheel 311 on the storage station 31 is actuated to rotate, the first driving wheel 321 is actuated to rotate reversely. Under the collective effects of the second conveyor belt, the first driving wheel 321, and the third driving wheel 311, the movement direction of the article 40 is changed from a downward movement to a leftward movement and enters a preset storage position for temporary storage. When the article 40 completely enters the storage station 31, the first driving wheel 321 and the third driving wheel 311 stop rotation.

When the article 40 needs to be output, the third driving wheel 311 on the storage station 31 and the second driving wheel 322 are actuated to rotate. By the collective effects of the second conveyor belt, the second driving wheel 322 and the third driving wheel 311, the article 40 move rightward to enter the conveying passage 32. When the article 40 completely enters the conveying passage 32, the second driving wheel 322 and the third driving wheel 311 stop rotation, and the article 40 moves under the drive of the second conveyor belt.

When the article 40 moves onto the second conveying line 20 through the second conveyor belt, the article 40 has an inertia of downward movement, so that the second driving wheel 322 moving to the output end of the second conveyor belt is actuated to rotate reversely. By cooperating the second driving wheel 322 with the second conveyor belt, the movement direction of the article 40 is changed by 90°. The article 40 is changed from a downward movement to a rightward movement, and then driven to be output by the third conveyor belt of the second conveying line 20.

By describing a plurality of embodiments of the article storage device, the palletizing system, and the article storage method of the present disclosure, it may be seen that the embodiments of the article storage device, the palletizing system, and the article storage method of the present disclosure have at least one or more of the following advantages:

1. the occupied area of the article storage device may be greatly reduced by using a double helix structure;

2. the first conveying line which uses a first conveying device including wobble wheels and a second conveying device including a first conveyer belt, reduces the cost of the article storage device and facilitates improving the conveying efficiency;

3. the temporary storage passages are plural so that different articles may be stored on different temporary storage passages respectively to realize the function of classifying the article;

4. the temporary storage passage is provided with a conveying passage and a storage station, so that the article may be output according to a required sequence so as to achieve the sequencing function.

Finally, it should be explained that: the aforementioned embodiments are only configured to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features without departing from the scope of the present disclosure, and they should all be covered in the scope of the technical solution for which protection is sought in the present disclosure.

What is claimed is:

1. An article storage device, comprising:
a first conveying line;
a second conveying line; and
a temporary storage passage,
wherein the first conveying line and the second conveying line ascend spirally around the temporary storage passage to form a double spiral structure, and two ends of the temporary storage passage are respectively in communication with the first conveying line and the second conveying line, the first conveying line conveys the article to the temporary storage passage, the temporary storage passage receives the article from the first conveying line and conveys the article to the second conveying line, and the second conveying line receives the article from the temporary storage passage and conveys the article, wherein the first conveying line comprises a first conveying device, for driving the article to move along an extension direction of the first conveying line, and driving the article to move from the first conveying device to the temporary storage passage, and wherein the first conveying device comprises a plurality of wobble wheels, wherein after actuation, the wobble wheels rotate to drive the article to move along an extension direction of the first conveying line, and an axis of the wobble wheels is rotatable to change a driving direction of the wobble wheels, so that the article moves from the first conveying line to the temporary storage passage.

2. The article storage device according to claim 1, wherein an upper surface of a conveying portion of the first conveying line that is in communication with the temporary storage passage is substantially flush with an upper surface of an entrance of the temporary storage passage; and/or, an upper surface of a conveying portion of the second conveying line that is in communication with the temporary storage passage is substantially flush with an upper surface of an exit of the temporary storage passage.

3. The article storage device according to claim 1, wherein an upper surface of the temporary storage passage is horizontally arranged.

4. The article storage device according to claim 1, wherein the first conveying line further comprises a second conveying device for driving the article to move along an extension direction of the first conveying line, and the second conveying device and the first conveying device are alternately arranged.

5. The article storage device according to claim 4, wherein the second conveying device comprises a first conveyor belt.

6. The article storage device according to claim 1, wherein the temporary storage passage comprises a storage station and a conveying passage, wherein the storage station is configured to receive the article from the conveying passage and convey the stored article to the conveying passage, and the conveying passage is configured to receive the article from the first conveying line, to convey the article to the storage station, to receive the article from the storage station, and to convey the article to the second conveying line.

7. The article storage device according to claim 6, wherein the conveying passage is provided with a second conveyor belt for driving the article to move to a preset storage position on the storage station.

8. The article storage device according to claim 7, wherein the second conveyor belt is provided with a driving wheel group, wherein after actuation, the driving wheel group rotates, such that the article moves from the first conveying line to the conveying passage, from the conveying passage to the storage station, from the storage station to the conveying passage, and then from the conveying passage to the second conveying line under the driving of the second conveyor belt and the driving wheel group.

9. The article storage device according to claim 8, wherein the second conveyor belt is provided with a plurality of the driving wheel groups, each of which comprises a first driving wheel arranged along a first direction and a second driving wheel arranged along a second direction, and there is an intersection angle between the first direction and the second direction.

10. The article storage device according to claim 6, wherein a third driving wheel is provided on the storage station, wherein after actuation, the third driving wheel rotates to move the article from the conveying passage to the storage station and from the storage station to the conveying passage.

11. The article storage device according to claim 1, wherein the article storage device comprises at least two layers of the temporary storage passages which are arranged along a vertical direction.

12. The article storage device according to claim 1, wherein the article storage device comprises a plurality of the temporary storage passages provided on the same layer.

13. The article storage device according to claim 12, wherein a plurality of the temporary storage passages provided on the same layer are arranged in parallel.

14. The article storage device according to claim 1, wherein the article storage device further comprises a scanning device for scanning a barcode on the article so as to obtain information of the article.

15. A palletizing system, comprising an article storage device, wherein the article storage device uses the article storage device according to claim 1 to temporarily store an article.

16. An article storage method based on the article storage device according to claim 1, comprising:
conveying an article to a temporary storage passage through a first conveying line;
receiving the article from the first conveying line through the temporary storage passage so as to temporarily store the article;
conveying the article to a second conveying line through the temporary storage passage; and
receiving the article from the temporary storage passage and conveying the article through the second conveying line.

17. The article storage method according to claim 16, wherein a specific operation of conveying an article to a temporary storage passage through a first conveying line comprises:
obtaining information of the article; and
conveying the article to the corresponding temporary storage passage based on the information.

18. The article storage method according to claim 17, wherein a specific operation of receiving the article from the first conveying line through the temporary storage passage so as to temporarily store the article; and conveying the article to a second conveying line through the temporary storage passage comprises that:
providing the temporary storage passage comprising a storage station and a conveying passage;
receiving the article from the first conveying line and conveying the article to the storage station through the conveying passage, and temporarily storing the article through the storage station; and
conveying the article located in the storage station according to a sequence determined based on the information to the second conveying line through the conveying passage.

19. An article storage device, comprising:
a first conveying line;
a second conveying line; and
a temporary storage passage, wherein the first conveying line and the second conveying line ascend spirally around the temporary storage passage to form a double spiral structure, and two ends of the temporary storage passage are respectively in communication with the first conveying line and the second conveying line, the first conveying line conveys the article to the temporary storage passage, the temporary storage passage receives the article from the first conveying line and conveys the article to the second conveying line, and the second conveying line receives the article from the temporary storage passage and conveys the article, wherein the first conveying line comprises a first conveying device, for driving the article to move along an extension direction of the first conveying line, and driving the article to move from the first conveying device to the temporary storage passage, and the first conveying line further comprises a second conveying device for driving the article to move along an extension direction of the first conveying line, and the second conveying device and the first conveying device are alternately arranged.

20. An article storage device, comprising:
a first conveying line;
a second conveying line; and
a temporary storage passage,
wherein the first conveying line and the second conveying line ascend spirally around the temporary storage passage to form a double spiral structure, and two ends of the temporary storage passage are respectively in communication with the first conveying line and the second conveying line, the first conveying line conveys the article to the temporary storage passage, the temporary storage passage receives the article from the first conveying line and conveys the article to the second conveying line, and the second conveying line receives the article from the temporary storage passage and conveys the article, wherein the temporary storage passage comprises a storage station and a conveying passage, wherein the storage station is configured to receive the article from the conveying passage and convey the stored article to the conveying passage, and the conveying passage is configured to receive the article from the first conveying line, to convey the article to the storage station, to receive the article from the storage station, and to convey the article to the second conveying line, wherein the conveying passage is provided with a second conveyor belt for driving the article to move to a preset storage position on the storage station, and wherein the second conveyor belt is provided with a driving wheel group, wherein after actuation, the driving wheel group rotates, such that the article moves from the first conveying line to the conveying passage, from the conveying passage to the storage station, from the storage station to the conveying passage, and then from the conveying passage to the second conveying line under the driving of the second conveyor belt and the driving wheel group.

\* \* \* \* \*